United States Patent
Gless et al.

(10) Patent No.: US 9,935,301 B2
(45) Date of Patent: Apr. 3, 2018

(54) PRESSURE EQUALIZATION ELEMENT, HOUSING COMPRISING A PRESSURE EQUALIZATION ELEMENT, LITHIUM ION ACCUMULATOR AND MOTOR VEHICLE

(75) Inventors: Michael Gless, Stuttgart-Zazenhausen (DE); Ulrich Zimmermann, Hessigheim (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 836 days.

(21) Appl. No.: 14/005,589

(22) PCT Filed: Mar. 12, 2012

(86) PCT No.: PCT/EP2012/054241
§ 371 (c)(1),
(2), (4) Date: Nov. 27, 2013

(87) PCT Pub. No.: WO2012/126758
PCT Pub. Date: Sep. 27, 2012

(65) Prior Publication Data
US 2014/0079964 A1   Mar. 20, 2014

(30) Foreign Application Priority Data
Mar. 22, 2011 (DE) .................. 10 2011 005 916

(51) Int. Cl.
*H01M 2/12* (2006.01)
*H01M 2/10* (2006.01)
(Continued)

(52) U.S. Cl.
CPC ....... *H01M 2/1264* (2013.01); *H01M 2/1072* (2013.01); *H01M 2/1094* (2013.01);
(Continued)

(58) Field of Classification Search
CPC .............................. H01M 2/12; H01M 2/1264
See application file for complete search history.

(56) References Cited

U.S. PATENT DOCUMENTS 4,561,559 A   12/1985   Rutan et al.
5,401,300 A    3/1995   Lokhandwala et al.
(Continued)

FOREIGN PATENT DOCUMENTS

CN      101682010 A       3/2010
DE   10 2007 011 026 A1   9/2008
(Continued)

OTHER PUBLICATIONS

International Search Report corresponding to PCT Application No. PCT/EP2012/054241, dated Jun. 5, 2012 (German and English language document) (7 pages).

*Primary Examiner* — Daniel Gatewood
(74) *Attorney, Agent, or Firm* — Maginot, Moore & Beck LLP

(57) ABSTRACT

A pressure equalization element for a housing includes a water-impermeable membrane. The membrane is combined with either a pressure relief valve acting in two directions or with a corresponding combination of two pressure relief valves such that a volume of air exchange is reduced. An amount of moisture transported into the housing is thus also reduced.

10 Claims, 1 Drawing Sheet

(51) Int. Cl.
*H01M 2/14* (2006.01)
*H01M 10/0525* (2010.01)
*H01M 10/52* (2006.01)

(52) U.S. Cl.
CPC ............... H01M 2/12 (2013.01); H01M 2/14 (2013.01); *H01M 10/0525* (2013.01); *H01M 10/52* (2013.01); *H01M 2220/20* (2013.01); *Y02E 60/122* (2013.01)

(56) References Cited

U.S. PATENT DOCUMENTS

2009/0263693 A1* 10/2009 Lee .................... C25B 9/06
 429/515
2011/0244278 A1* 10/2011 Joswig ................ H05K 5/0213
 429/56

FOREIGN PATENT DOCUMENTS

| DE | 10 2008 034 698 A1 | 6/2009 | |
| DE | 102008034698 A1 * | 6/2009 | ........... B01D 53/261 |
| DE | 10 2008 034 879 A1 | 1/2010 | |
| EP | 0 504 573 A1 | 9/1992 | |
| WO | 2009/001947 A1 | 12/2008 | |
| WO | WO 2009001947 A1 * | 12/2008 | ............... H01G 9/12 |
| WO | WO 2009109323 A1 * | 9/2009 | .......... H01M 2/1229 |

* cited by examiner

PRESSURE EQUALIZATION ELEMENT, HOUSING COMPRISING A PRESSURE EQUALIZATION ELEMENT, LITHIUM ION ACCUMULATOR AND MOTOR VEHICLE

This application is a 35 U.S.C. § 371 National Stage Application of PCT/EP2012/054241, filed on Mar. 12, 2012, which claims the benefit of priority to Serial No. DE 10 2011 005 916.4, filed on Mar. 22, 2011 in Germany, the disclosures of which are incorporated herein by reference in their entirety.

The present disclosure relates to a pressure equalization element for a housing having a water-impermeable membrane, a housing having a pressure equalization element, a lithium ion accumulator having a housing, and a motor vehicle.

BACKGROUND

In devices such as batteries, which have a housing with an enclosed air volume that is subject to temperature changes and hence to changes in volume, a pressure equalization element (PEE) is normally used. This is a microporous membrane, e.g. one made of polytetrafluoroethylene, such as a Gore-Tex membrane, which is permeable to air but watertight. This PEE ensures complete pressure equalization, that is to say the same air pressure is established inside and outside the housing with a short delay. This pressure equalization is necessary if the housing cannot withstand the possible difference between the internal and the external pressure. A pressure difference of up to 1 bar is possible due to changes in temperature and external pressure during transportation by aircraft, for example.

One problem with the use of such pressure equalization elements with water-impermeable membranes, such as a Gore-Tex® membrane, is that, although they are impermeable to water in the liquid state of aggregation, they are not permeable to water vapor. If the external atmosphere is humid, moist air can penetrate the housing. If there is a region within the device which is cooled to temperatures below the external temperature, there may be condensation of this atmospheric moisture on the cooled regions. This condensation can lead to failures of the device.

SUMMARY

According to the disclosure, a pressure equalization element (PEE) is made available for a housing having a water-impermeable membrane, preferably one made of polytetrafluoroethylene, wherein a pressure relief valve acting in two directions or a combination of two pressure relief valves acting in opposite directions is arranged upstream or downstream of the membrane.

Suitable materials for such membranes, which are permeable to air but prevent liquids from passing through, are known to a person skilled in the art from the prior art.

Suitable pressure relief valves, e.g. duckbill valves, are likewise known to a person skilled in the art from the prior art.

The subject matter of the disclosure also includes a housing for a device, e.g. for a lithium ion accumulator having active climate control, which is equipped with the abovementioned pressure equalization element.

The statements below relate equally to the pressure equalization element and to the housing equipped therewith.

The pressure relief valve or pressure relief valves is/are set in such a way that pressure equalization takes place only when the pressure difference between the interior of the housing and the surroundings becomes so large that it approaches the stability limits of the housing. This critical pressure can be different for excess pressure and reduced pressure. This advantageously prevents the entry of air and hence moisture into the housing due to frequent small pressure differences, owing to slight changes in the external temperature for example. Only in the case of pressure differences which are relatively large but generally only occur infrequently would an exchange of air then take place.

Reducing the volume of air exchanged as far as possible is at the heart of the present disclosure. This also reduces the amount of atmospheric moisture carried into the housing.

In addition, the housing preferably has conventional means for removing atmospheric moisture, e.g. a desiccant, thus allowing the small amount of atmospheric moisture which nevertheless enters the housing during a pressure equalization to be reliably removed. These means are known to a person skilled in the art from the prior art.

The membrane and the pressure relief valve or pressure relief valves are preferably combined into a closed unit, which is integrated into the wall of the housing. By way of example, the closed unit can be formed by a tube structure in which the membrane is arranged in one end region and the valve or valves is/are arranged in the opposite end region of the tube structure.

The unit is preferably integrated into the wall of the housing in such a way that, when viewed from the interior, the membrane comes first and is then followed by the pressure relief valve or pressure relief valves. By means of this preferred embodiment, the adiabatic expansion can advantageously be used for additional dehumidification of the air as air flows in.

Thus, the pressure relief valve opens in the presence of an external excess pressure and, upon entry, the air expands and cools as a result. In the process, its capacity to absorb moisture decreases and, in the event of high relative air humidity, some of the atmospheric moisture will condense in the region of the closed unit, and can no longer pass through the membrane. Thus, the condensate does not enter the interior of the housing.

In order to discharge the condensed water back out of the closed unit, the outward-opening pressure relief valve should be arranged in such a way that the water can collect in the region of the pressure relief valve. In the event of an excess pressure in the interior of the housing and the equalization thereof by the pressure relief valve, the condensed water is carried outward. Since the water in the closed unit moves in the direction of gravity, the corresponding pressure relief valve is preferably arranged at the lowest point of the closed unit. A depression to hold the water can additionally be provided in this region.

A condensation plate is preferably arranged in the inflow region, behind the pressure relief valve, in the interior of the closed unit, preventing the condensate from spreading throughout the interior of the closed unit. Moreover, the condensation plate is advantageously provided with a slope in the direction of the lowest point of the closed unit, with the result that the condensate drips off in that part of the valve through which the air flows in the direction of the exterior. When this valve is next opened, condensed water is carried outward as well, as already explained. However, it is also possible to transfer the condensate into some other suitable position for rapid discharge through an appropriate choice of dripping point.

Depending on the positioning of the closed unit on the housing, the tube structure can be adapted to transfer the condensate in an optimum manner in the interior. If the pressure equalization element is arranged at the bottom, for instance, the tube structure can extend in a straight line and, given lateral mounting, the tube structure can be angled in the direction of gravity.

According to another embodiment of the disclosure, it is also possible to reverse this abovementioned sequence of the membrane and the pressure relief valves, so that, when viewed from the interior, the pressure relief valve or pressure relief valves comes/come first, followed by the membrane, thus making it possible to prevent the entry of dirt into the closed unit.

It is likewise possible to arrange a membrane on both sides of the pressure relief valve or pressure relief valves. In order also to be able to make use of the adiabatic effect for dehumidification of the air in this arrangement, the outer membrane is preferably arranged exclusively in the region of the inward-acting pressure relief valve or of the corresponding part of the pressure relief valve, thus allowing the outflowing air to carry away condensed water through the outward-acting pressure relief valve or the corresponding part of a pressure relief valve.

The disclosure furthermore relates to lithium ion accumulators with active internal cooling, which are arranged in a housing according to the disclosure.

The subject matter of the disclosure furthermore includes a motor vehicle having an electric drive motor for driving the motor vehicle and having a lithium ion accumulator according to the disclosure, which is connected or can be connected to the electric drive motor and is configured in accordance with the disclosure.

Advantageous developments of the disclosure are described in the description below.

BRIEF DESCRIPTION OF THE DRAWINGS

Illustrative embodiments of the disclosure are explained in greater detail by means of the drawings and of the following description. In the drawings.

DETAILED DESCRIPTION

Figure 1:
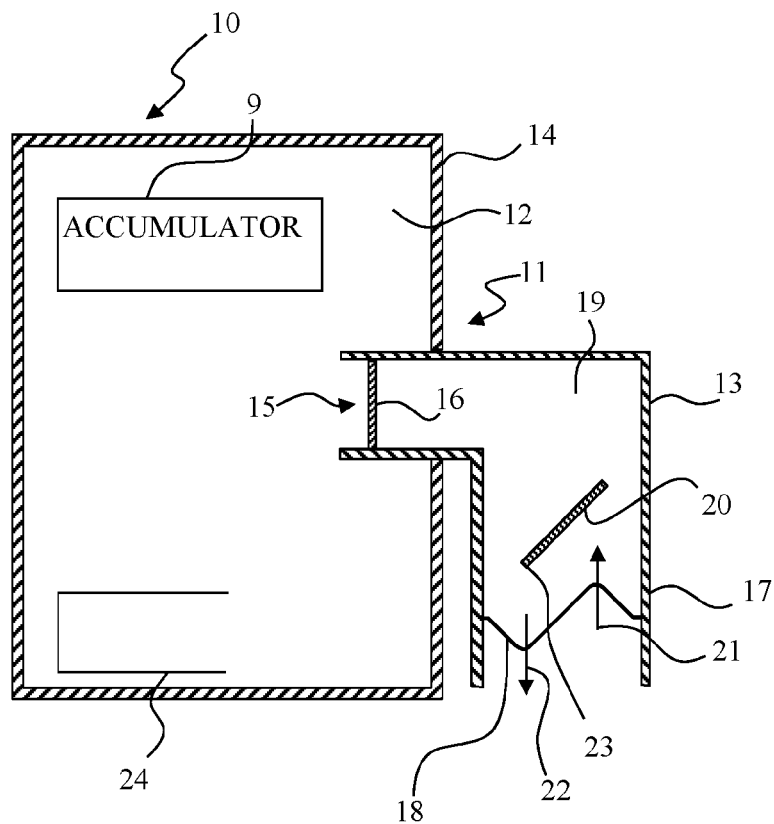
FIG. 1 shows a housing having a pressure equalization element according to the disclosure in a schematic view.

A housing 10 for a device, e.g. a lithium-ion accumulator 9, having a pressure equalization element 11 is shown schematically in FIG. 1. The interior 12 of the housing 10 is closed off from the surroundings, and air from the surroundings can enter or leave only via the pressure equalization element 11. The pressure equalization element 11 comprises a tube structure 13, which is passed through the wall 14 of the housing 10. The opening 15 in the tube structure 13 leading into the housing 10 is closed by a water-impermeable membrane 16. Outside the housing 10, the tube structure 13 is angled in the direction of gravity. The angled end 17 of the tube structure 13 is closed by means of a double duckbill valve 18. A condensation plate 20 is arranged in the inflow region for the external air 21 in the interior 19 of the tube structure 13. As external air 21 enters, it impinges upon the condensation plate 20 and the atmospheric moisture condenses out of the external air 21. The condensation plate extends obliquely with respect to that part of the double duckbill valve 18 which carries the air 22 to the outside when there is excess pressure in the housing 10, and it forms a dripping point 23, from which condensate is guided to the double duckbill valve 18. When there is excess pressure in the housing 10, the condensate is carried to the outside with the air 22. A container 24 with a desiccant (not shown specifically) is additionally arranged in the interior 12 of the housing 10 in order to dry entering air.

Figure 2:
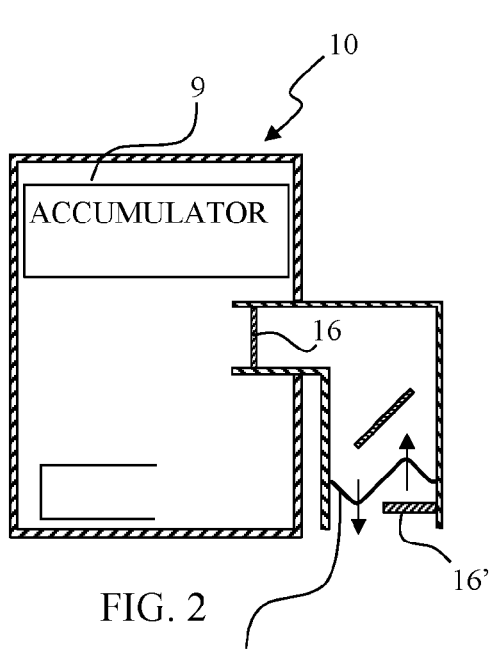
FIG. 2 shows the housing of FIG. 1 with a second water-impermeable membrane arranged on a side of the pressure relief valve which faces away from the first membrane and arranged only in the region of the inward-acting pressure relief valve.

FIG. 2 shows the housing 10 of FIG. 1 with a second water-impermeable membrane 16' arranged on a side of the pressure relief valve 18 which faces away from the first membrane 16 and arranged only in the region of the inward-acting pressure relief valve 18.

Figure 3:
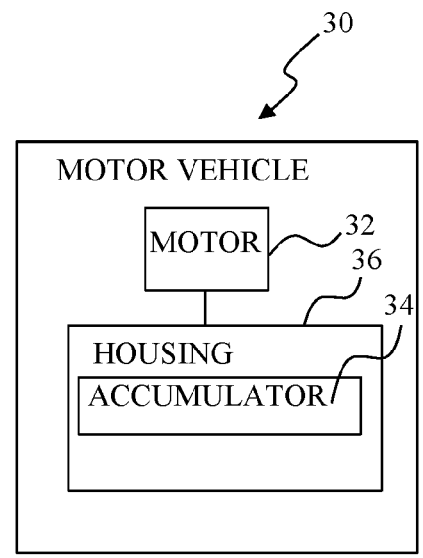
FIG. 3 shows a motor vehicle having an electric drive motor for driving the motor vehicle and having a lithium ion accumulator in a housing like the accumulator and housing of FIG. 1.

FIG. 3 shows a motor vehicle 30 having an electric drive motor 32 for driving the motor vehicle 30 and having a lithium ion accumulator 34 in a housing 36 like the accumulator 9 and housing 10 of FIG. 1.

The invention claimed is:

1. A pressure equalization element for a housing comprising:
a water-impermeable membrane; and
a pressure relief valve assembly configured to open in a first configuration to vent gas in a first direction through the pressure relief valve assembly, and to open in a second configuration to vent gas in a second direction through the pressure relief valve assembly,
wherein the pressure relief valve assembly is arranged upstream or downstream of the membrane.

2. The pressure equalization element as claimed in claim 1, wherein the membrane and the pressure relief valve assembly is combined into a closed unit.

3. The pressure equalization element as claimed in claim 2, wherein the closed unit is a tubular structure closed at a first end by the membrane and closed at a second end by the pressure relief valve assembly.

4. The pressure equalization element as claimed in claim 2, wherein:
the pressure relief valve assembly is configured to open in the first configuration to vent gas in the first direction out of the closed unit through an outward-acting pressure relief valve; and
the pressure equalization element is configured such that when installed on a housing, the outward-acting pressure relief valve is arranged at a lowest point, in relation to gravity, of the closed unit.

5. The pressure equalization element as claimed in claim 4, further comprising:
a condensation plate arranged in an interior of the closed unit, in a region of an inward-acting pressure relief valve of the pressure relief valve assembly,
wherein said plate is configured to have a dripping point situated in a region of the outward-acting pressure relief valve.

6. The pressure equalization element as claimed in claim 5, further comprising:
a second water-impermeable membrane,
wherein the inward acting pressure relief valve is located between the first membrane and the second membrane and said second membrane is arranged only in the region of the inward-acting pressure relief valve.

7. A housing assembly, comprising:
a housing; and
a pressure equalization element configured to equalize pressure between the housing and an external atmosphere, the pressure equalization element including:
   a water-impermeable membrane; and
   a pressure relief valve assembly-configured to open in a first configuration to vent gas in a first direction through the pressure relief valve assembly, and to open in a second configuration to vent gas in a second direction through the pressure relief valve assembly,
wherein the pressure relief valve assembly is arranged upstream or downstream of the membrane.

8. The housing assembly as claimed in claim 7, further comprising a mechanism configured to remove atmospheric moisture arranged in the housing.

9. The housing assembly as claimed in claim 7, further comprising:
a lithium ion accumulator within the housing and having an active climate control system.

10. A motor vehicle, comprising:
an electric drive motor configured to propel the motor vehicle; and
a lithium ion accumulator connected or configured to be connected to the electric drive motor,
wherein the lithium ion accumulator has an active climate control system and is arranged in a housing, the housing having a pressure equalization element, including:
   a water-impermeable membrane; and
   a pressure relief valve assembly configured to open in a first configuration to vent gas in a first direction through the pressure relief valve assembly, and to open in a second configuration to vent gas in a second direction through the pressure relief valve assembly,
wherein the pressure relief valve assembly is arranged upstream or downstream of the membrane.

\* \* \* \* \*